Patented Dec. 19, 1944

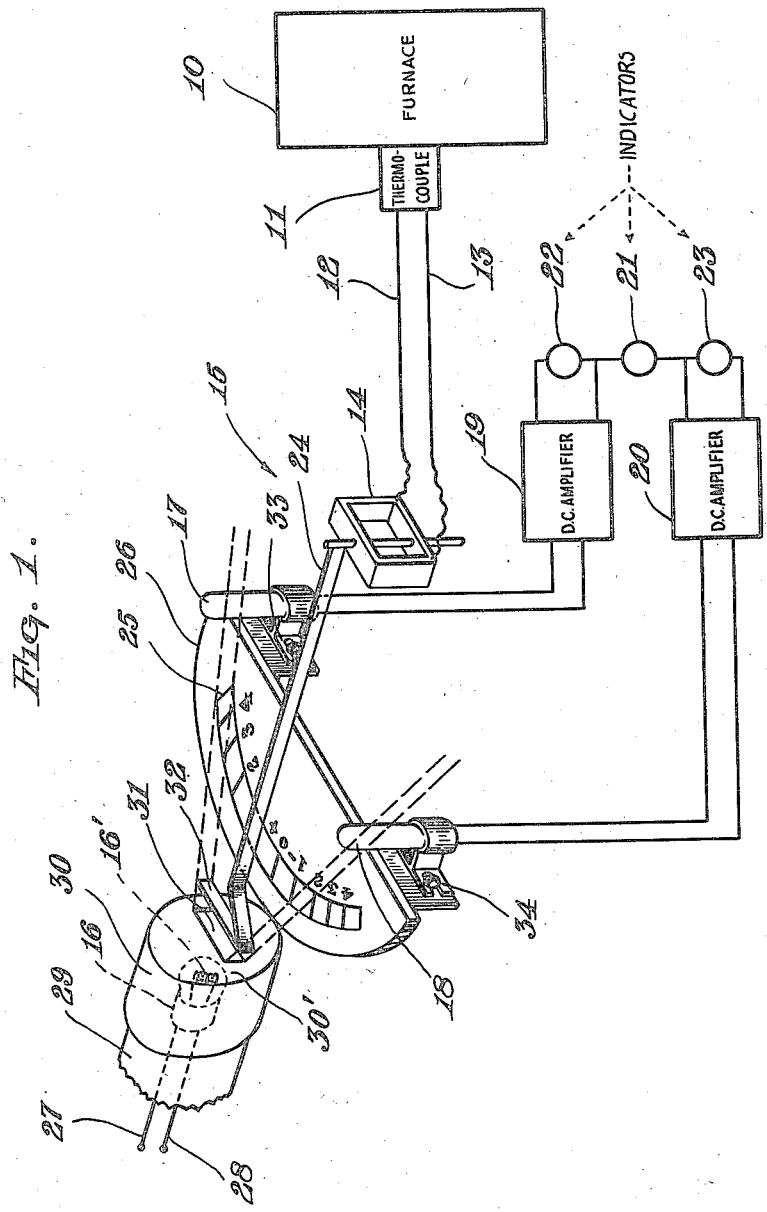

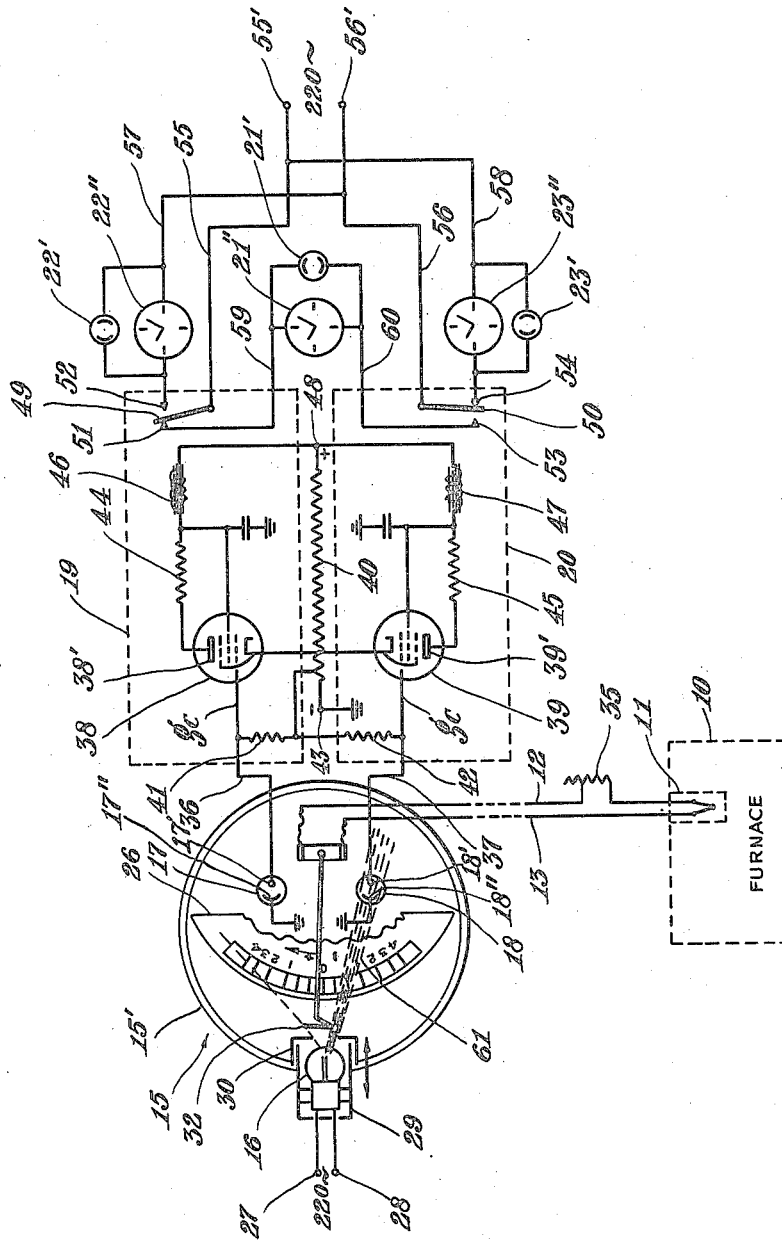

2,365,601

UNITED STATES PATENT OFFICE 2,365,601

ELECTRONIC INDICATING DEVICE

Lambertus Cornelis Sipman, Buenos Aires, Argentina, assignor to Hartford National Bank and Trust Company, Hartford, Conn., as trustee Application January 10, 1944, Serial No. 517,728

7 Claims. (Cl. 177—311)

This invention relates to indicating or control devices and more particularly to an electronic indicating device wherein light-sensitive tubes are utilized as a means for checking the correct operating conditions of a process.

Light-sensitive tubes or phototubes, i. e. tubes capable of transforming light energy into electrical energy, are widely used in a plurality of indicating or control devices. Preferably, the condition or operation to be controlled or indicated directly controls the intensity of a light beam and these intensity variations, transformed into electrical energy in the light-sensitive tube, are utilized to actuate electrical or mechanical indicating means associated with the control device or system.

Under certain circumstances, however, it is not possible to directly modulate the intensity of the light beam with the controlled quantity, so that deviations of the light beam from a fixed predetermined position are used to reproduce the variations in the condition to be observed. Usually, indicating devices of the latter type are provided with an electrical measuring instrument coupled with means for transforming the energy of the observed condition into an electrical quantity, the moving system of the instrument being used to control the deflection angle of the light beam. Consequently, in these electronic indicating devices the commanding element is constituted by the combination of an electrical measuring instrument with one or more light-sensitive tubes, while in the former kind of indicating devices only the light-sensitive tube forms the controlling element of the system.

In practice, two general types of combined controlling elements are used. In one, based on the so-called "hole-in-the-meter" principle, the meter scale is provided with a slot, and the optical system of the device is arranged so that, unless the slot is covered by the instrument pointer, the light beam is focused on a light-sensitive tube mounted below the slot. The intensity of the light beam thus varies between zero and a maximum value and is controlled by the position of the instrument pointer, the light-sensitive tube being excited only when the instrument pointer shifts from its position over the slot. The controlling elements using the "hole-in-the-meter" principle are of a very simple and economic construction but can be used only in processes wherein the tolerance of the indicating or control range may be relatively large, since the sensitivity of these elements is mainly determined by the sensitivity of the meter used and the length of the meter pointer.

In control or indicating devices, in which a large sensitivity is required, i. e. wherein the observed condition has to be controlled or indicated within close limits, the deflection of the instrument moving system is generally used to obtain a deviation of the light beam from a predetermined position, this deviation being proportional to the change or variation in the observed condition. For this purpose, the moving coil or pointer of the meter is provided with a mirror forming part of the optical system of the control device, so that a deflection of the moving coil is considerably amplified by means of the light beam. Hence, it is possible to increase the sensitivity of the controlling elements of the deflection type to very high values, since the sensitivity of the indicating device is defined by the length of the deflected portion of the light beam. In fact, there are electronic indicating or control devices of the type referred to, which easily detect variations from 0.001–0.0007% in the controlled condition.

However, one of the main disadvantages of the commanding elements referred to, consists therein that the mirror places a considerable load on the moving element of the meter and thus not only makes the mechanical design of the instrument rather complicated, but also affects the response characteristics of the indicating device.

A further disadvantage of these indicating devices is that an increase in the length of the light beam may be accompanied by a considerable decrease in the intensity thereof so that high gain direct current amplifiers have to be used in order to obtain a sufficient amplification of the weak electrical currents induced in the light-sensitive tubes.

I have now found that by providing the instrument pointer with a cross-piece acting as a shutter between a light source and light-sensitive means all located in a plane including the plane of movement of the pointer, an improved electronic indicating or control device will be obtained in which the simplicity and dependability of the commanding element based on the "hole-in-the-meter" principle effectively combine with a sensitivity similar to that of the mirror galvanometer devices.

More particularly, in the indicating device according to my invention the light source is enclosed in a housing provided with a slot located in the plane of movement of the pointer of an instrument responsive to an electrical quantity derived from the process condition to be observed by means of an energy transforming device which, for instance, in temperature indicating devices is generally formed by a thermocouple. Two light-sensitive tubes are located adjacent to the moving coil of the instrument and symmetrically arranged at both sides of the instrument pointer, so that when the latter is in a position corresponding to the correct operating zone of the observed condition, both light-sensitive tubes are located within the cone of shade formed by the cross-piece of the instrument pointer and an indicating means coupled to the output circuits of the electronic amplifiers associated with the light-sensitive tubes is rendered operative to visualize the fact that the value of the observed condition falls within the correct operating zone.

However, as soon as a change in this condition causes a deviation of the instrument pointer, one of the light-sensitive tubes is excited by a beam of light passing through that portion of the slot not covered by the crosspiece, this change hence being visualized by the indicating means connected to the electronic amplifier associated with the operative light-sensitive tube. Simultaneously, the common indicating means for visualizing the correct operating zone is rendered inoperative.

It is therefore one of the main objects of the present invention to provide an electronic indicating device wherein the deflection of an instrument pointer is directly amplified by means of a light beam without the use of mirrors or other deflecting surfaces mounted on the moving parts of the instrument.

A further object of the invention is to provide an electronic indicating or control device comprising a controlling element in which the deflection of an electromechanical part is considerably amplified by means of a relatively short light beam so that the element can be assembled into a compact and small unit.

Another object of the present invention is to provide an electronic indicating device in which the limits of the indicating or control range can be easily adjusted by changing the position of either the light source or the light-sensitive tubes.

A still further object of the present invention is to provide an electronic indicating device comprising means for automatically integrating the curve representing the variations in the operating condition of the observed process.

The above and further objects and novel aspects of the invention will become more apparent from the following detailed description taken with reference to the accompanying drawings in which I have diagrammatically indicated a preferred embodiment of my invention as applied to temperature control. It is to be understood, however, that the application of my invention hereinafter described, is illustrative only of various applications of which the invention is susceptible.

In the drawings:

Fig. 1 is a perspective view of the controlling element and a diagrammatic illustration of the electronic indicating device according to the present invention, while Fig. 2 is a wiring diagram of the electronic indicating device shown in Fig. 1, the indicating means being coupled with integrator devices.

Referring now to the drawings, wherein like reference characters in the different figures designate similar or like circuit elements, let it be assumed that rectangle 10 represents a furnace operating at some predetermined temperature and that the electronic indicating device, according to the present invention, shall provide a visual indication of the furnace temperature corresponding to a correct operating zone and shall also indicate or visualize a positive or negative deviation of the temperature from its correct value.

For this purpose furnace 10 is provided with thermocouple 11 which transforms the heat energy derived from the furnace temperature into electrical energy which is applied through connections 12 and 13 to moving coil 14 of an electrical instrument 15, constituting together with light source 16 and light-sensitive tubes 17 and 18 the controlling element of the electronic indicating device according to the present invention.

As can be seen in the drawings, light-sensitive tube 17 is coupled to an indicating means 22 by means of a direct current amplifier 19, while light-sensitive tube 18 is connected to indicating means 23 through direct current amplifier 20, the output circuits of direct current amplifiers 19 and 20 being further connected to a common indicating means 21 for visualizing the correct operating zone of the furnace temperature.

Electrical instrument 15 is designed so that when the furnace temperature corresponds to the correct operating zone, blade-shaped pointer 24 mounted on moving coil 14, is maintained above the zero central division of scale 25 drawn on scale plate 26 of the instrument, while a decrease or increase in the furnace temperature will produce a deflection of instrument pointer 24 towards the negative or positive divisions, respectively, of scale 25. The divisions of scale 25 can be directly calibrated in temperature degrees, or, as done in the controlling element illustrated in Fig. 1, can be marked with arbitrary positive and negative numerals 1, 2, 3, 4, etc., in order to facilitate the use of the electronic indicating device, according to the present invention, for other industrial processes.

Light source 16 is constituted by an electric lamp connected through conductors 27 and 28 to the mains or other adequate source of electrical energy, the lamp being enclosed in a tubular housing 29 which is mounted on casing 15' of instrument 15 (Fig. 2). Housing 29 is provided on its end directed towards scale plate 26 with a slidable cap 30 having a slot 31 in its frontal portion 30', slot 31 being located in a plate substantially corresponding to the plane of movement of instrument pointer 24. Housing 29 and especially filament 16' of lamp 16 are centered on a line formed by the virtual extension of pointer 24 located above the 0 central division of scale 25. At the same time filament 16' is placed perpendicularly to slot 31 so that only the small portion of the filament visible through slot 31 constitutes a point light source with respect to light-sensitive tubes 17 and 18.

As can be seen in Fig. 1, pointer 24 extends beyond scale 25 and scale plate 26 and has its end bent at a right angle, the bent portion forming a cross-piece 32 extending symmetrically at each side of the straight portion of pointer 24, being located in the virtual plane of movement of said pointer and parallel to the longitudinal axis of slot 31.

With pointer 24 in its central position, crosspiece 32 is located in front of slot 31 thus acting as a shutter which prevents light from lamp 16 reaching light-sensitive tubes 17 and 18 which are mounted on adjustable supports fixed to scale plate 26 at each side of a virtual line connecting light source 16 with the fulcrum of pointer 24 and passing through the 0 central division of scale 25.

The longitudinal extensions of slot 31 and cross-piece 32, the distance between filament 16' and cross-piece 32 on one hand and cross-piece 32 and light-sensitive tubes 17 and 18 on the other hand, and the distance between light-sensitive tubes 17 and 18 are adjusted so that said tubes are located within the cone of shade formed by cross-piece 32 when the temperature of furnace 10 has a value falling within the correct operating zone of the furnace.

Light-sensitive tubes 17 and 18 are placed relatively close to the boundaries of the shade cone formed by cross-piece 32, so that a slight deviation of pointer 24 from its central position, i. e. a slight variation in the furnace temperature falling outside the correct operating zone, will immediately place one of the light-sensitive tubes in a beam of light 61 passing through the portion of slot 31 not covered by cross-piece 32 as can be seen in the drawing shown in Fig. 2.

The combination of instrument pointer 24 with the light beam produced by lamp 16 and controlled by cross-piece 32 as described hereinbefore, constitutes a considerable advance in the technique of the application of light-sensitive tubes, since the sensitivity of the commanding element of the electronic indicating device, according to the present invention, can be made as large as desired either by changing the mechanical dimensions of instrument pointer 24 and cross-piece 32, or by adjusting the distance between said cross-piece 32 and slot 31 or light-sensitive tubes 17 and 18, respectively. At the same time, the deflection of instrument pointer 24 can be made larger for the central region of scale 25 by conveniently shaping the magnetic field in which moving coil 14 is located, so that a very small variation in the temperature of furnace 10 will cause a large deflection of instrument pointer 24 which in turn will cause a still larger deflection of the light beam generated by light source 16, the relation between the deflection angles of pointer 24 and light beam 61, for example, being chiefly determined by the ratio of the distances between cross-piece 32, filament 16' and light-sensitive tubes 17 and 18, respectively.

As can be observed in the circuit shown in Fig. 2, connector 12, coupling one pole of thermocouple 11 with one of the terminals of moving coil 14, includes a potentiometer 35 by means of which pointer 24 can be adjusted to the center of scale 25 for any predetermined temperature of furnace 10.

Anodes 17' and 18' of light-sensitive tubes 17 and 18 are connected through conductors 36 and 37 to the control grids $g_c$ of thermionic amplifier tubes 38 and 39, respectively. At the same time a positive potential derived from a voltage divider 40 is applied to anodes 17' and 18' through plate resistances 41 and 42, respectively, which also constitute the grid leak resistances of amplifier tubes 38 and 39. The cathodes of these tubes are connected to a point on said voltage divider 40 which is slightly positive with respect to the point from which the positive potential for anodes 17' and 18' of the light-sensitive tubes is derived, the cathodes 17'' and 18'' of these tubes being connected to ground potential to which negative pole 43 of voltage divider 40 is also connected.

Each anode 38' or 39' of electronic amplifier tubes 38 and 39, is connected through current limiting resistance 44, relay 46, or current limiting resistance 45, relay 47, respectively, to the positive pole 48 of voltage divider 40. Relays 46 and 47 are each provided with movable contact arms 49 and 50 respectively, each arm operating between make contact 51 and break contact 52, or make contact 53 and break contact 54. Movable contact arm 49 of relay 46 is connected through conductor 55 to pole 55' of the alternating current supply, the other pole 56' of which is connected by means of conductor 56 to movable contact arm 50 of relay 47.

Make contact 51 of relay 46 and make contact 53 of relay 47 are connected to indicating means 21' constituted by a gaseous discharge tube through conductors 59 and 60, respectively, while indicating means 22' being also constituted by a gaseous discharge tube, is inserted in conductor 57 connecting break contact 52 of relay 46 to pole 56' of the alternating current supply. Gaseous discharge tube 23' forming the other indicating means is inserted in conductor 58 connecting break contact 54 of relay 47 to the opposite pole 55' of said alternating current supply. Thus the lighting of either gaseous discharge tubes 22' or 23' is controlled by relay 46 or 47, respectively, while gaseous discharge tube 21', being common to the output circuits of electronic amplifiers 19 and 20, is rendered operative when both relays 46 and 47 are in their operative position.

As already explained hereinabove, instrument pointer 24 is located over the central division of scale 25 when the furnace temperature corresponds to a value falling within the correct operating zone, light-sensitive tubes 17 and 18 being hence located within the shade cone formed by cross-piece 32 and being practically non-condutive. Consequently, thermionic amplifier tubes 38 and 39 are conductive since their control grids $g_c$ are at a low negative potential with respect to their cathodes.

Hence, the plate current of tubes 38 and 39 render operative relays 46 and 47 which attract movable contact arms 49 and 50, so that indicating tube 21' is connected across the alternating current supply by means of conductors 59, 60, make contacts 51, 53, movable contact arms 49, 50 and conductors 55, 56. Thus, as long as the temperature in furnace 10 stays within the correct operating zone, lighted gaseous discharge tube 21' will visualize the correct operation of furnace 10.

However, as soon as a variation, for example an increase, in the temperature of furnace 10 causes pointer 24 to deflect towards the positive divisions of scale 25 as shown in the drawing of Fig. 2, one boundary of the shaded area is shifted from the vicinity of light-sensitive tube 18 towards the center of electrical instrument 15 due to the displacement of cross-piece 32 in front of slot 31. Thus a light beam 61 coming from filament 16' and passing through the section of slot 31 not covered by cross-piece 32, strikes light-sensitive tube 18, while light-sensitive tube 17 remains within the shaded area formed by cross-piece 32 in its new position.

Light-sensitive tube 18 is thus made conductive and the current passing through its plate resistance 42 places a larger negative bias potential on control grid $g_c$ of amplifier tube 39, the plate current of which decreases considerably so that movable contact arm 50 of relay 47 is released and moves back to break contact 54, thus completing the supply circuit of indicating gaseous discharge tube 23' and simultaneously interrupting the supply circuit of gaseous discharge tube 21'.

An increase in the furnace temperature is thus indicated by the lighting of gaseous discharge tube 23', while the lighting of gaseous discharge tube 22' will correspond to a temperature decrease. Furthermore, since gaseous discharge tube 21' is common to both electronic amplifiers 19 and 20, the tube not only indicates the correct operating temperature of furnace 10 but may also be regarded as the pilot light of the electronic indicating device according to the present invention. In fact, an extinction of gaseous discharge tube 21' which is not accompanied by a simultaneous lighting of gaseous discharge tubes 22' or 23', will clearly indicate the incorrect operation of the indicating device.

In some industries, as for instance in the glass industry, the indicating device shall not only provide a visual indication of the variations in the furnace temperature, but shall also render it possible to determine for a given period the time during which the furnace operated on its correct temperature, and the total of the time intervals during which the furnace temperature was below or above its correct value. In the embodiment of the present invention, shown in Fig. 2, this has been accomplished by connecting self-starting electric synchronous clocks 21'', 22'' and 23'' in parallel with indicating gaseous discharge tubes 21', 22' and 23' respectively, so that these clocks automatically carry out an integration of the temperature variations of furnace 10, the time indicated by each clock representing the total of the time intervals during which the furnace temperature has stayed on the corresponding value.

Although the embodiment of the present invention illustrates an electronic indicating device, adapted to temperature control it will be evident for those skilled in the art, that the novel indicating device can also be utilized to control the operating conditions of other industrial processes and that it can be easily transformed into a device for automatically controlling the condition to be observed without departing from the scope of the present invention, as set forth in the appended claims.

I claim:

1. An electronic device for indicating a predetermined operating zone of a condition of a process and the deviations of said condition from said predetermined zone, which comprises means for transforming energy derived from said process condition into electrical energy, a measuring instrument responsive to said electrical energy and provided with a pointer, a source of light energy, a portion of said pointer acting as shutter between said light source and a first and second light-sensitive means located at each side of said pointer and operatively coupled with a first and second indicating means, respectively, said first and second light-sensitive means being also operatively coupled to a common indicating means, both light-sensitive means being located within a shade area formed by said shutter portion to render operative said common indicating means when the pointer position corresponds to said predetermined zone, while either of said first and second light-sensitive means is energized by said light source to render operative the first and second indicating means, respectively, and to render inoperative said common indicating means, when said shade area shifts in response to a pointer deflection caused by a deviation of said condition from said zone.

2. An electronic device for indicating a predetermined operating zone of a condition of a process and the deviations of said condition from said predetermined zone, which comprises means for transforming energy derived from said process condition into electrical energy, a measuring instrument responsive to said electrical energy and provided with a pointer the deflections of which are univocally related to the deviations of said condition from said predetermined zone, a source of light energy located on a line formed by the virtual extension of said pointer in its position corresponding to said predetermined zone, a portion of said pointer acting as shutter between said light source and a first and second light-sensitive means located at each side of said pointer and operatively coupled with a first and second indicating means, respectively, said first and said second light-sensitive means being also operatively coupled to a common indicating means, both light-sensitive means being located within a shade area formed by said shutter portion to render operative said common indicating means when the pointer position corresponds to said predetermined zone, while either of said first and second light-sensitive means is energized by said light source to render operative the first and second indicating means, respectively, and to render inoperative said common indicating means when said shade area shifts in response to a pointer deflection caused by a deviation of said condition from said zone.

3. An electronic device for indicating a predetermined operating zone of a condition of a process and the deviations of said condition from said predetermined zone, which comprises means for transforming energy derived from said process condition into electrical energy, and a measuring instrument responsive to said electrical quantity and provided with a pointer the deflections of which are univocally related to the deviations of said condition from said predetermined zone, a source of light energy located on a line formed by the virtual extension of said pointer in its central position corresponding to said predetermined zone and adjustably mounted in the direction of said line, said pointer being provided with a cross-piece acting as a shutter between said light source and a first and second light-sensitive tubes placed at each side of said pointer and having their light-sensitive portions substantially located in a plane passing through said light source and including said cross-piece, each of said first and second light-sensitive tubes being coupled through a direct current amplifier to a first and second indicating means, respectively, the outputs of said direct current amplifiers being also coupled to a common indicating means, both light-sensitive tubes being located within a shade area formed by said pointer cross-piece to render operative said common indicating means when the pointer takes said central position corresponding to said predetermined zone, while either of said first and second light-sensitive tubes is energized by said light source to render operative the first and second indicating means, respectively, and to simultaneously render inoperative said common indicating means when said shade area shifts in response to a pointer deflection caused by a deviation of said condition from said zone.

4. An electronic device for indicating a predetermined operating zone of a condition of a process and the deviations of said condition from said predetermined zone, which comprises means for transforming energy derived from said process condition into electrical energy, a measuring instrument responsive to said electrical energy and provided with a pointer the deflections of which are univocally related to the deviations of said condition from said predetermined zone, a source of light energy enclosed in a casing having a slot and slidably mounted in the direction of a line formed by the virtual extension of said pointer in its central position corresponding to said predetermined zone, first and second light-sensitive tubes located at each side of said pointer and mounted on supports provided with means for varying the distance between said light-sensitive means in a direction substantially parallel to the longitudinal axis of said slot, a portion of said pointer being bent at a substantially right angle to form a cross-piece acting as shutter between said slot and said first and second light-sensitive tubes, direct current amplifiers coupled to said light sensitive tubes and to a first and a second indicating means, respectively, the outputs of said direct current amplifiers being also coupled to a common indicating means, said cross-piece together with said slot and the light-sensitive portions of said light-sensitive tubes being substantially located in a plane including the virtual plane of movement of said pointer, the light-sensitive portions of said light-sensitive tubes being located within a shade area formed by said crosspiece to render operative said common indicating means when the pointer takes said central position corresponding to said predetermined zone, while either of said first and second light-sensitive tubes is energized by said light source to render operative the first and second indicating means, respectively, and to simultaneously render inoperative said common indicating means when said shade area shifts in response to a pointer deflection caused by a deviation of said condition from said zone.

5. An electronic device for indicating a predetermined operating zone of a condition of a process and the deviations of said condition from said predetermined zone, comprising means for transforming the energy derived from said process condition into electrical energy, a measuring instrument responsive to said electrical energy and provided with a pointer having a cross-piece acting as shutter between a source of light energy and first and second phototubes located at each side of said pointer and mounted on supports adjustable in a direction substantially perpendicular to said pointer in its central position, said light source being slidably mounted in a direction of a line formed by the virtual extension of said pointer in its central position corresponding to said predetermined zone, the anode circuits of said first and second phototubes being directly coupled to the control grids of a first and second thermionic tube, respectively, connected as direct current amplifiers to a source of direct current voltage, the anode circuits of each of said first and second thermionic tubes including a relay the contacts of which are inserted in the supply circuit of a first and second gaseous discharge tube, respectively, said contacts of said relays forming also part of the supply circuit of a common gaseous discharge tube, said phototubes being located within a shade area formed by said cross-piece to render operative said common gaseous discharge tube when the pointer takes said central position corresponding to said predetermined zone, while either of said first and second phototubes is energized by said light source to complete the supply circuit of said first and second gaseous discharge tube, respectively, while simultaneously interrupting the supply circuit of said common gaseous discharge tube when said shade area shifts in response to a pointer deflection caused by a deviation of said condition from said zone.

6. An electronic indicating device, according to claim 5, wherein said energy transforming means are constituted by a thermocouple for deriving from the temperature variations of a furnace a variable electrical quantity applied to the moving coil of said measuring instrument.

7. An electronic indicating device according to claim 5, where self-starting synchronous electric clocks are connected in parallel with said gaseous discharge tubes.

LAMBERTUS CORNELIS SIPMAN.